(12) United States Patent
Wirth et al.

(10) Patent No.: US 12,611,972 B2
(45) Date of Patent: Apr. 28, 2026

(54) CHILD SEAT HAVING A SEAT BELT GUIDE ASSEMBLY

(71) Applicant: Britax Römer Kindersicherheit GmbH, Leipheim (DE)

(72) Inventors: Michael Wirth, Neu-Ulm (DE); Fabian Lissek, Ulm (DE)

(73) Assignee: Britax Römer Kindersicherheit GmbH, Leipheim (DE)

( * ) Notice: Subject to any disclaimer, the term of this patent is extended or adjusted under 35 U.S.C. 154(b) by 80 days.

(21) Appl. No.: 18/514,706

(22) Filed: Nov. 20, 2023

(65) Prior Publication Data

US 2024/0217399 A1     Jul. 4, 2024

(30) Foreign Application Priority Data

Dec. 29, 2022     (EP) ..................................... 22217240

(51) Int. Cl.
B60N 2/28 (2006.01)

(52) U.S. Cl.
CPC .................................. B60N 2/2812 (2013.01)

(58) Field of Classification Search
CPC .... B60N 2/2818; B60N 2/2803; B60N 2/265; B60N 2/688; B60R 2022/1818
See application file for complete search history.

(56) References Cited

U.S. PATENT DOCUMENTS

| | | | |
|---|---|---|---|
| 5,733,004 A | 3/1998 | Celestina-Krevh | |
| 5,897,169 A * | 4/1999 | Larsen .................... | B60R 22/26 |
| | | | 297/483 |
| 6,749,223 B2 * | 6/2004 | Kazuo .................... | B60R 22/20 |
| | | | 297/483 |
| 7,273,232 B2 * | 9/2007 | Fontecchio ............. | B60R 22/26 |
| | | | 297/483 |

(Continued)

FOREIGN PATENT DOCUMENTS

| | | |
|---|---|---|
| CN | 101254775 A | 9/2008 |
| CN | 204 623 215 U | 9/2015 |

(Continued)

OTHER PUBLICATIONS

European Search Report, on European Patent Application No. EP 22 21 7240.

(Continued)

*Primary Examiner* — David R Dunn
(74) *Attorney, Agent, or Firm* — K&L Gates LLP

(57) ABSTRACT

A child seat having a seat assembly, a back assembly connected to the seat assembly, and a seat belt guide assembly attached to the back assembly, the guide assembly including an openable ring having a closed condition defining an aperture and an open condition, the ring including a flexible gate portion terminating at a connector; and a receiver support portion terminating at a receiver for receiving the connector; wherein the connector and the receiver are separable through elastic bending of the gate portion to (Continued)

open the ring sufficiently to allow installation of a vehicle seat belt there-through, and wherein the connector and the receiver are mutually shaped to form a latch, the latch releasably holding the gate portion and the receiver support portion together.

13 Claims, 9 Drawing Sheets

(56) References Cited

U.S. PATENT DOCUMENTS

| | | | | |
|---|---|---|---|---|
| 7,387,315 | B2 * | 6/2008 | Nett ...................... | F16B 45/023 |
| | | | | 24/598.2 |
| 8,439,439 | B2 * | 5/2013 | Meeker ................ | B60N 2/2806 |
| | | | | 297/250.1 |
| 10,604,108 | B2 * | 3/2020 | Abramoski ............. | B60R 22/26 |
| 11,110,886 | B2 | 9/2021 | Inoue | |
| 2007/0188001 | A1 | 8/2007 | Nett et al. | |
| 2008/0100122 | A1 | 5/2008 | Bell et al. | |
| 2012/0217787 | A1 | 8/2012 | Adolfsson et al. | |
| 2015/0266448 | A1 | 9/2015 | Aoki et al. | |

FOREIGN PATENT DOCUMENTS

| | | | |
|---|---|---|---|
| DE | 102008009070 | A1 | 9/2009 |
| DE | 102015224611 | A1 | 6/2017 |
| EP | 1514748 | A1 | 6/2006 |
| KR | 20070079479 | A | 8/2007 |

OTHER PUBLICATIONS

Extended European Search Report for EP Application No. 25182182. 3-1009 / 4596317 dated Dec. 9, 2025.

* cited by examiner

Fig. 1A          Fig. 1B

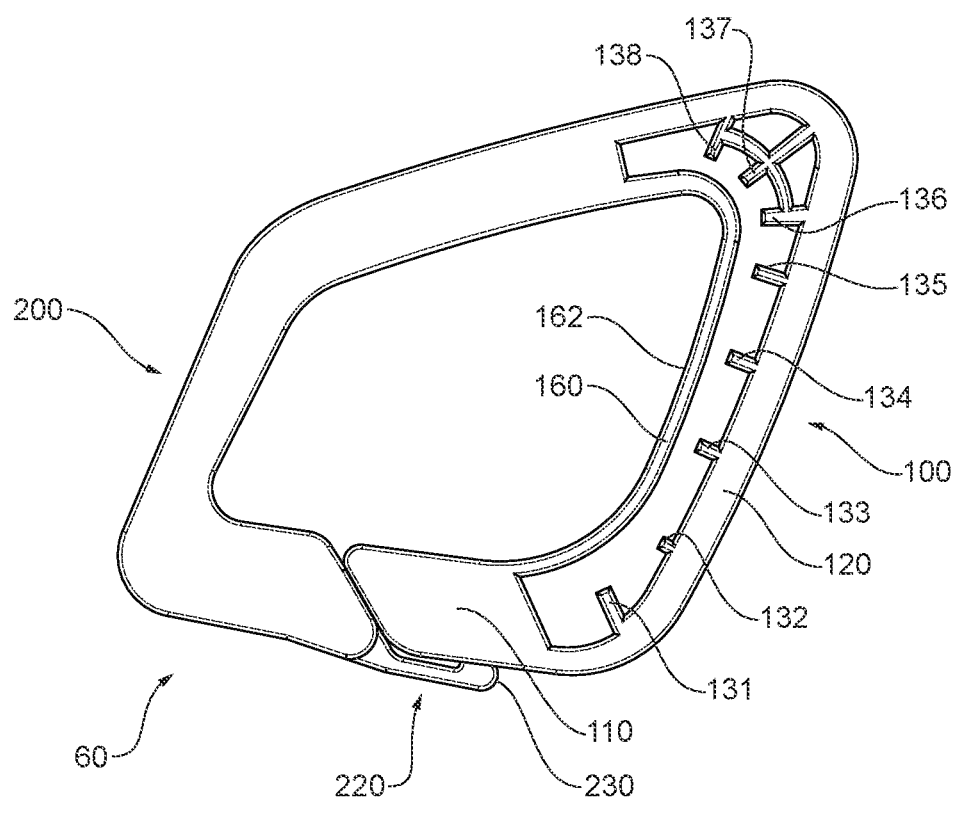
Fig. 5
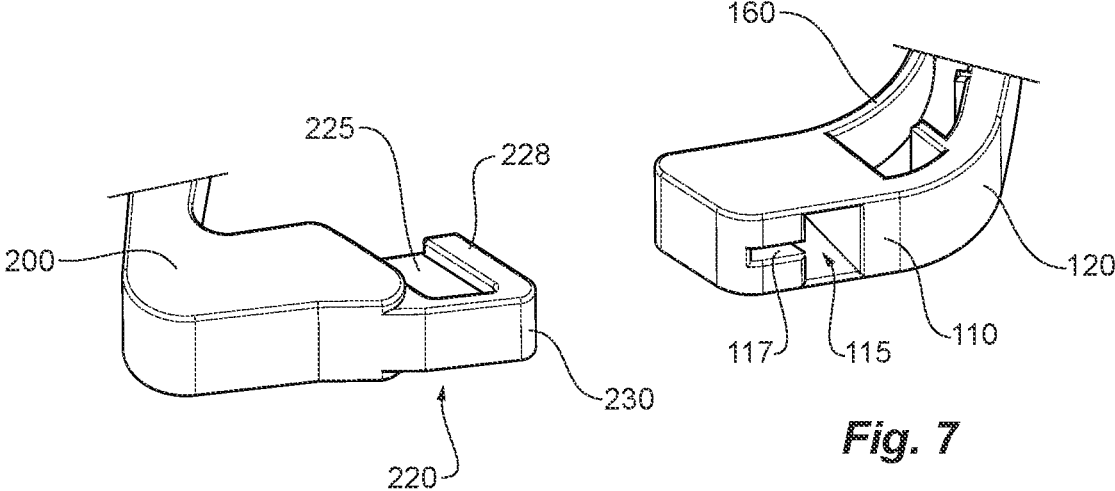
Fig. 6
Fig. 7

CHILD SEAT HAVING A SEAT BELT GUIDE ASSEMBLY

PRIORITY CLAIM AND CROSS-REFERENCE TO RELATED APPLICATIONS

The present application claims priority to and the benefit of European Patent Application No. 22217240.5 filed Dec. 29, 2022, titled A CHILD SEAT HAVING A SEAT BELT GUIDE ASSEMBLY, the entire contents of which are incorporated by reference herein in their entirety and relied upon.

TECHNICAL FIELD

The present disclosure relates to a vehicle-mountable child safety seat assembly. In particular, the disclosure relates to a vehicle-mountable child safety seat assembly having a seat belt guide assembly.

BACKGROUND

Child safety seat assemblies, or child safety seats, are secured inside a vehicle to protect children in vehicles from the effects of accidents, sudden deceleration, or other impacts or jarring events. A typical child safety seat assembly may include various protective features relating to securing the child safety seats in the vehicle, securing the child to the child safety seat, and protecting the child once the child is secured in the child safety seat.

Child safety seats are typically placed on a standard car seat and secured in position either with dedicated devices including ISOFIX connectors, foot props, top tethers or with the vehicle's seat belt for that seat. Often a combination of the afore-mentioned devices is used to secure the safety seat to the vehicle.

With some child safety seats, the vehicle seat belt is drawn around the safety seat and across the body of the child occupant so as to secure the child to the safety seat. Seat belt guides are known to be formed in the backrest assembly of some of these safety seats. Such backrest assemblies typically include headrest assemblies, and with such arrangements, the seatbelt guides are typically provided as a part of the headrest assembly.

It is important that, once the seat belt has been deployed correctly through the belt guide, the seat belt remains within the belt guide at all times while the safety seat is occupied.

It is desirable that the process to securely deploying the seat belt though the belt guide is easy for the adult who is assisting the child into the safety seat. It is also desirable that the process of removing the seat belt from the belt guide so as to remove the safety seat from the vehicle is not too difficult.

It is against this background that the present disclosure has been developed.

SUMMARY

According to a first aspect, there is provided a child seat having: a seat assembly, a back assembly connected to the seat assembly, and a seat belt guide assembly attached to the back assembly, the guide assembly including:

an openable ring having a closed condition defining an aperture and an open condition, the ring including:
a flexible gate portion terminating at a connector; and
a receiver support portion terminating at a receiver for receiving the connector;

wherein the connector and the receiver are separable through elastic bending of the gate portion to open the ring sufficiently to allow installation of a vehicle seat belt there-through, and wherein the connector and the receiver are mutually shaped to form a latch, the latch releasably holding the gate portion and the receiver support portion together.

In one form, the connector is biased into engagement with the receiver.

In one form, the back assembly includes:
a back-support portion; and
a headrest assembly, the headrest assembly moveable with respect to the back-support portion,
wherein the seat belt guide assembly is attached to the headrest assembly.

In one form, the receiver support portion includes a belt lead.

In one form, the belt lead includes a lead face, the lead face angled so as to lead a belt edge of the seat belt towards the aperture when the ring is in the closed condition.

In one form, in use, the gate portion is openable by seat belt tension delivered by a user, a belt face of the seat belt engaging with an outer surface of outer arm of the gate portion and the belt edge guided by the lead face, such that the flexible gate portion bends sufficiently to allow entry of the seat belt into the aperture.

In one form, in the closed condition, the lead face and the outer surface of the outer arm meet to define an acute angle.

In one form, the connector is hand-moveable through an arc from the closed condition to the open condition.

In one form, in the open condition, the connector is displaced inwardly with respect to the receiver, the inward displacement providing an opening into the ring.

In one form, the gate portion and connector are arranged and constructed such that movement of the connector in a direction perpendicular to the arc is resisted.

In one form, the gate portion includes an outer arm and an inner arm, the inner arm disposed radially inwards from the outer arm and having an inner surface for guiding a seat belt.

In one form, a plurality of ribs are disposed between the inner arm and the outer arm, the ribs having a fixed end and free end, the fixed end fixed with respect to one or other of the inner arm and the outer arm,
whereby the ribs limit the relative displacement of the inner arm towards the outer arm.

In one form, one or more of the plurality of ribs limit the relative displacement of the inner arm towards the outer arm during an accident, thereby reducing any tendency for movement to the open condition.

In one form, the latch includes a tongue and a mouth, one of the tongue and the mouth located on the receiver and the other of the tongue and the mouth located on the connector,
wherein, in the closed condition, the tongue and the mouth are engaged and
wherein, in the open condition, the tongue and the mouth are disengaged.

In one form, the latch includes a web connected to the tongue.

BRIEF DESCRIPTION OF DRAWINGS

Embodiments of the present invention will be discussed with reference to the accompanying drawings wherein:

FIGS. 1A, 1B and 1C each show perspective views of a child seat according to a first embodiment of the disclosure progressively showing installation of a seat belt from the position in FIG. 1A to the position shown in FIG. 1C.

FIG. 5 shows a seat belt guide assembly component of a child seat according to a second embodiment of the disclosure.

FIGS. 6 and 7 are detailed perspective views of portions of the seat belt guide assembly component shown in FIG. 5.

DESCRIPTION OF EMBODIMENTS

Referring to FIGS. 1A, 1B, 1C, 2A and 2B, a child seat 10 having a seat assembly 30, a back assembly 20 connected to the seat assembly, and a seat belt guide assembly 60 attached to the back assembly is shown.

Figure 1C:
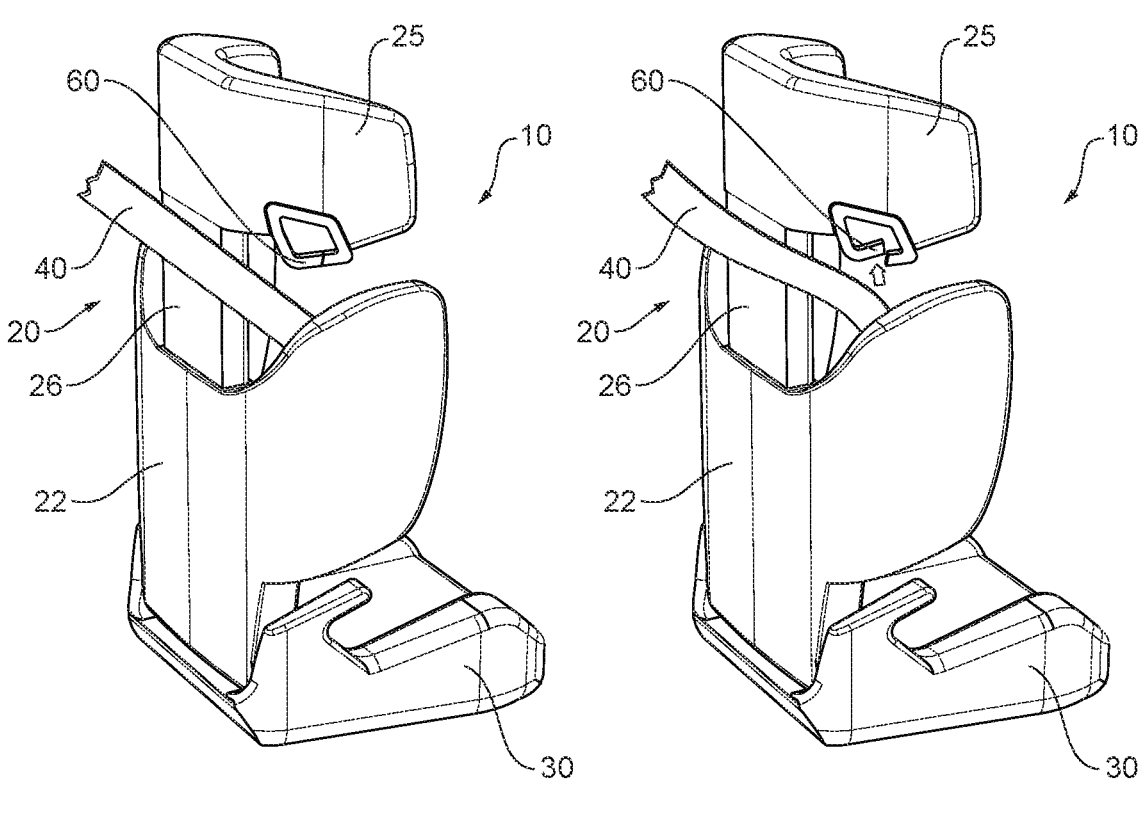
Figure 1C:
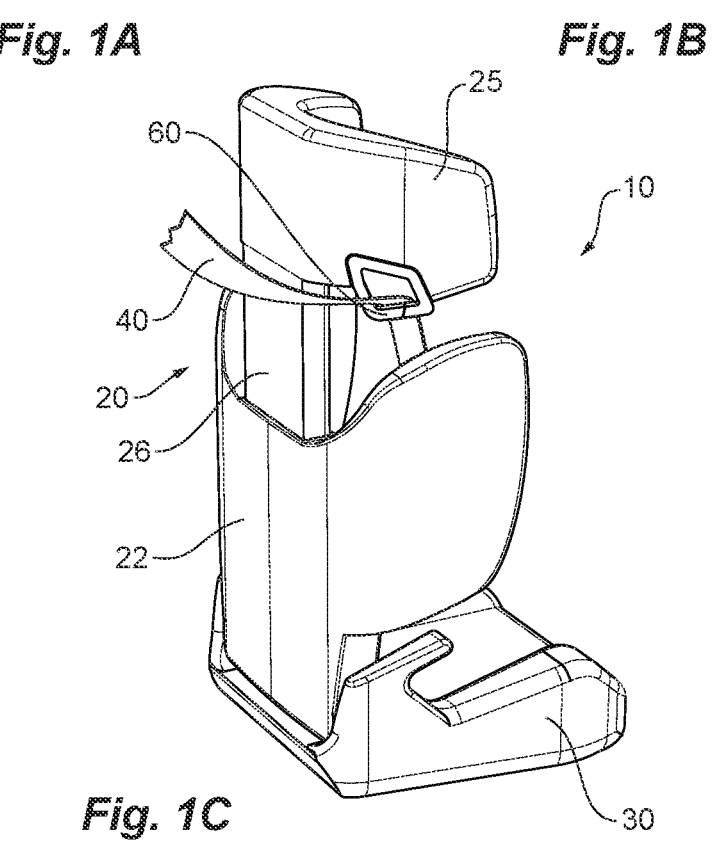

The back assembly 20 of FIGS. 1A, 1B, 1C includes a back-support portion 22 and a headrest assembly 25. The headrest assembly is moveable with respect to the back-support portion and the seat belt guide assembly 60 is attached to the headrest assembly 25. It can also be seen in FIGS. 1A to 1C that the headrest assembly 25 includes a headrest support leg 26. In some embodiments, child seat 10 is arranged and constructed to allow telescopic height adjustment of the head rest assembly 25 with the headrest support leg 26 telescopically extending down into a support slide within the back-support portion 22.

Figure 16:
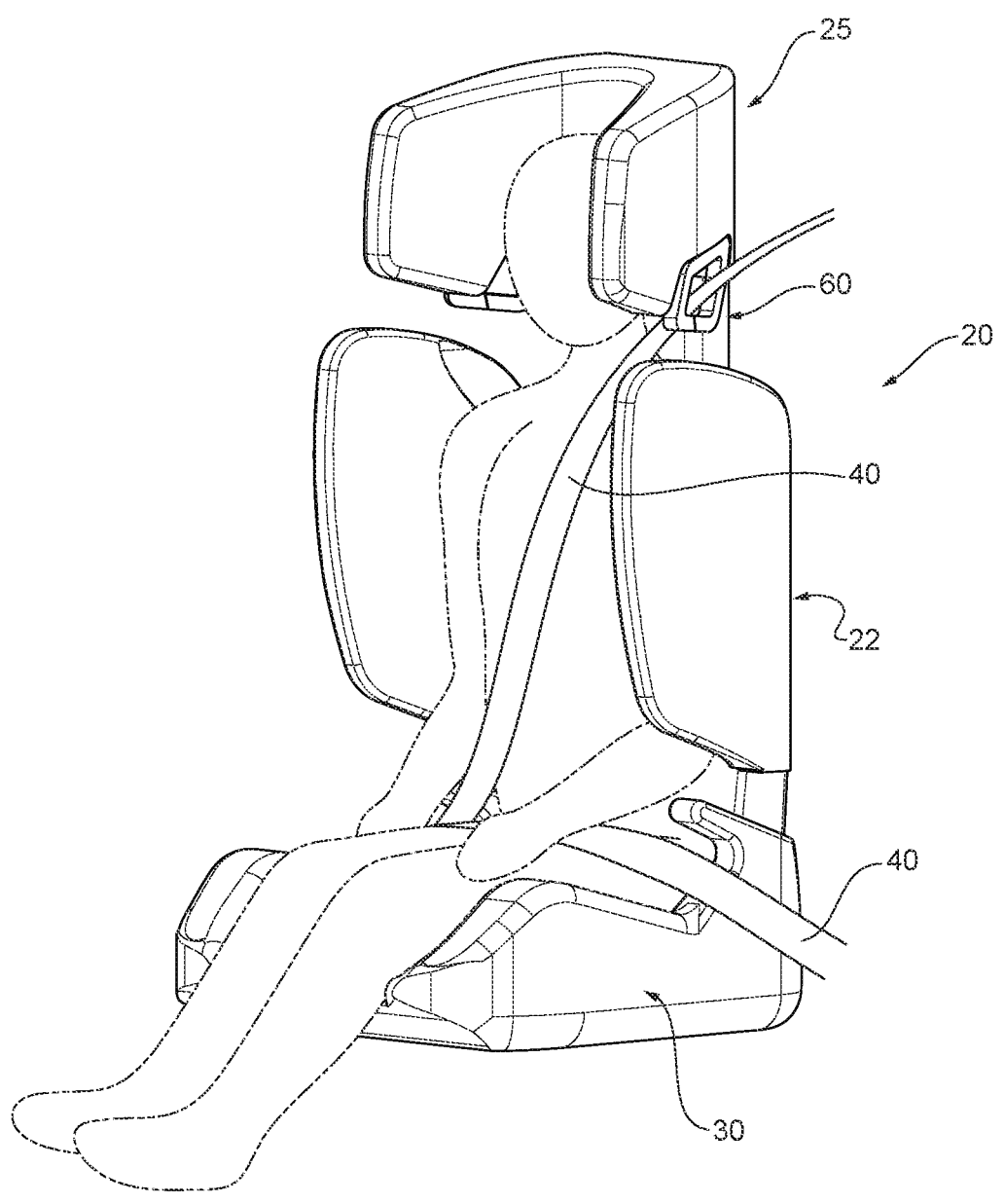
FIG. 16 shows a perspective view of a child seat according to an eleventh embodiment of the disclosure.

In alternative embodiments, a child seat 10 may have a back assembly that includes a non-adjustable headrest assembly that is integral with a back-support portion, the headrest assembly including a seat belt guide assembly 60. An example of this is shown in FIG. 16, described further below.

The guide assembly 60 includes an openable ring defining an aperture 95 and having a closed condition and an open condition. The closed condition is shown in FIGS. 1A and 1C. The open condition is shown in FIG. 1B.

The ring includes a flexible gate portion 100 terminating at a connector 110 and a receiver support portion 200 terminating at a receiver 220 for receiving the connector 110. The connector 110 and the receiver 220 are separable through elastic bending of the gate portion 100 to open the ring sufficiently to allow installation of a vehicle seat belt there through as is most clearly illustrated in FIG. 1B. The connector 110 and the receiver 220 are mutually shaped to form a latch. The latch releasably holds the gate portion 100 and the receiver support portion 200 together.

The connector 110 is biased into engagement with the receiver 220.

Again referring to FIG. 1B and FIGS. 2A and 2B, it can be seen that the connector 110 is hand movable through an arc from the closed condition shown in FIGS. 1A, 1C and 2A to the open condition shown in FIGS. 1B and 2B. In the open condition, shown in FIG. 2B, the connector 110 is displaced inwardly with respect to the receiver 220, the inward displacement providing an opening 150 into the ring. This opening 150 allows the user to insert the vehicle's seatbelt 40 into the ring of the guide assembly 60 such that the seatbelt 40 is constrained as is shown in FIG. 1C.

A belt lead 230 is provided on the end of the receiver 220. This belt lead 230 assists in guiding the belt 40 into the opening 150 through the latch when in the position illustrated in FIG. 1B.

Figures 2A, 2B, 3, 4:
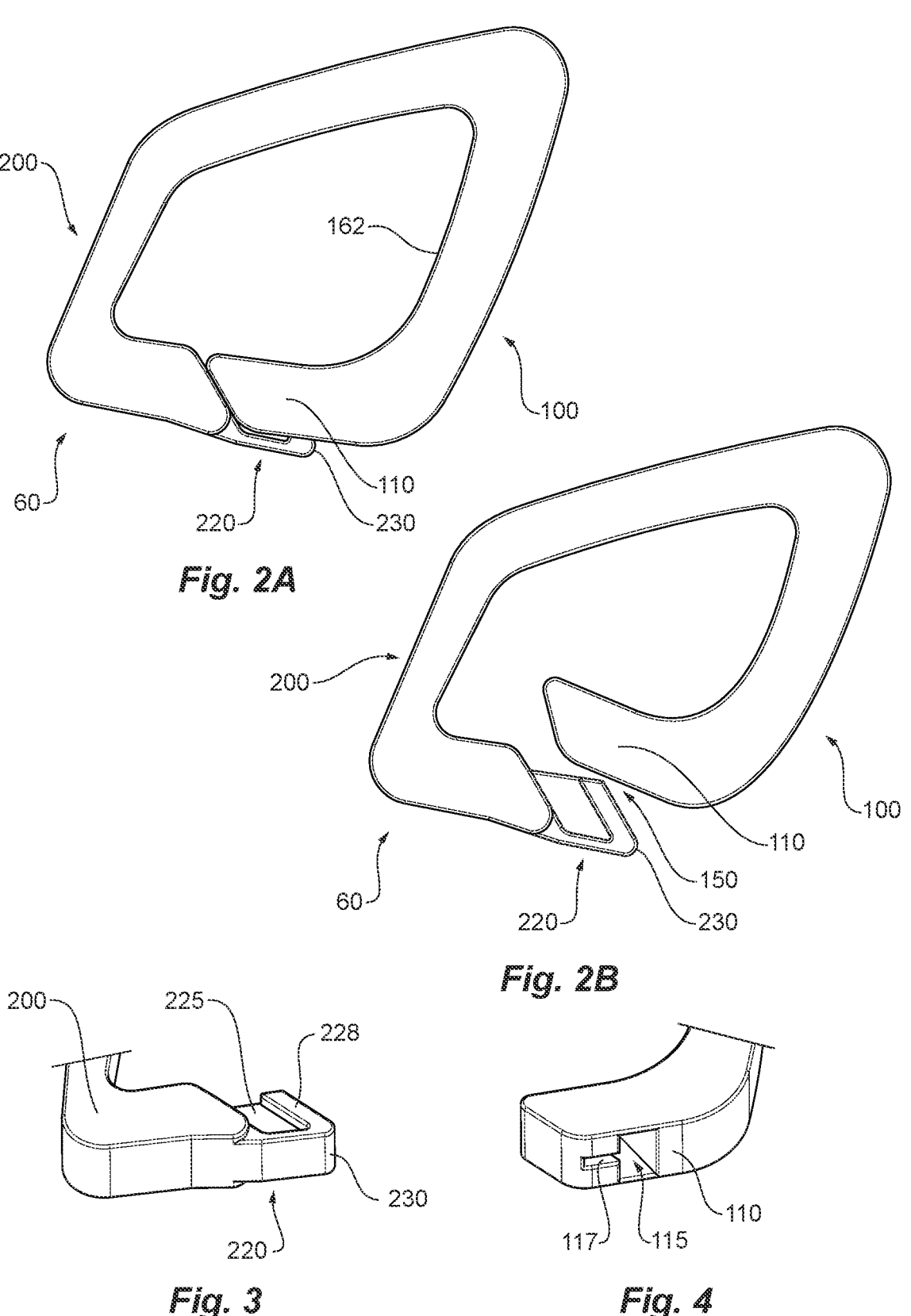
FIG. 2A is a side view showing a seat belt guide assembly component of the child seat of FIGS. 1A, 1B and 1C according to a first embodiment of the disclosure.
FIG. 2B is a similar view to that of FIG. 2A, but shows the seat belt guide assembly component in an open condition.
FIGS. 3 and 4 are detailed views of portions of the seat belt guide assembly shown in FIGS. 2A and 2B, the portions together forming a latch.

Referring to FIGS. 3 and 4, it can be seen that the latch includes a tongue 228. The tongue 228, which in the embodiment illustrated forms part of the receiver 220, is arranged and constructed to be received by a mouth 115 shown in FIG. 4. A web 225 is also provided, the web 225 connected to the tongue 228. A slot 117, also shown in FIG. 4, is provided in the connector 110 to accommodate the web 225. In the closed condition, the tongue and the mouth are engaged, and, in the open condition, the tongue and the mouth are disengaged.

Referring to FIGS. 5, 6 and 7, a child seat 10 according to a second embodiment of the disclosure is shown. With this embodiment, the gate portion 100 and connector 110 are arranged and constructed as is shown most clearly in FIG. 5 such that movement of the connector 110 in a direction perpendicular to the arc is resisted. In other words, while the gate portion 100 facilitates movement through an arc to open the ring for insertion or removal of seat belt 40, lateral movement which could misalign the latch is resisted.

The gate portion 100 includes an outer arm 120 and an inner arm 160. The inner arm 160 is disposed radially inwards from the outer arm 120 and has an inner surface 162 for guiding a seat belt 40, such as the seat belt 40 shown in FIG. 1C.

Referring again to FIG. 5, it can be seen that the seat belt guide assembly 60 has a plurality of ribs disposed between the inner arm 160 and the outer arm 120. The ribs have a fixed end and a free end. The fixed end is fixed with respect to one or other of the inner arm 160 and the outer arm 120. The ribs limit the relative displacement of the outer arm 120 towards the inner arm 160. This can be seen in the embodiment of FIG. 5. With this embodiment, ribs 131, 132, 133, 134, 135, 136, 137, 138 have a fixed end connected to the outer arm 120 and a free end adjacent to the inner arm 160.

The ribs, or at least some of the ribs, limit the relative displacement of the outer arm 120 towards the inner arm 160 as is explained in further detail with reference to FIGS. 9A and 9B.

The ribs are arranged and constructed to improve the stiffness against lateral bending of the gate portion 100 or bending in a direction perpendicular to the arc mentioned above. At the same time, the ribs do not significantly increase the resistance against bending along the arc within a desired operational range.

Figures 8A, 8B:
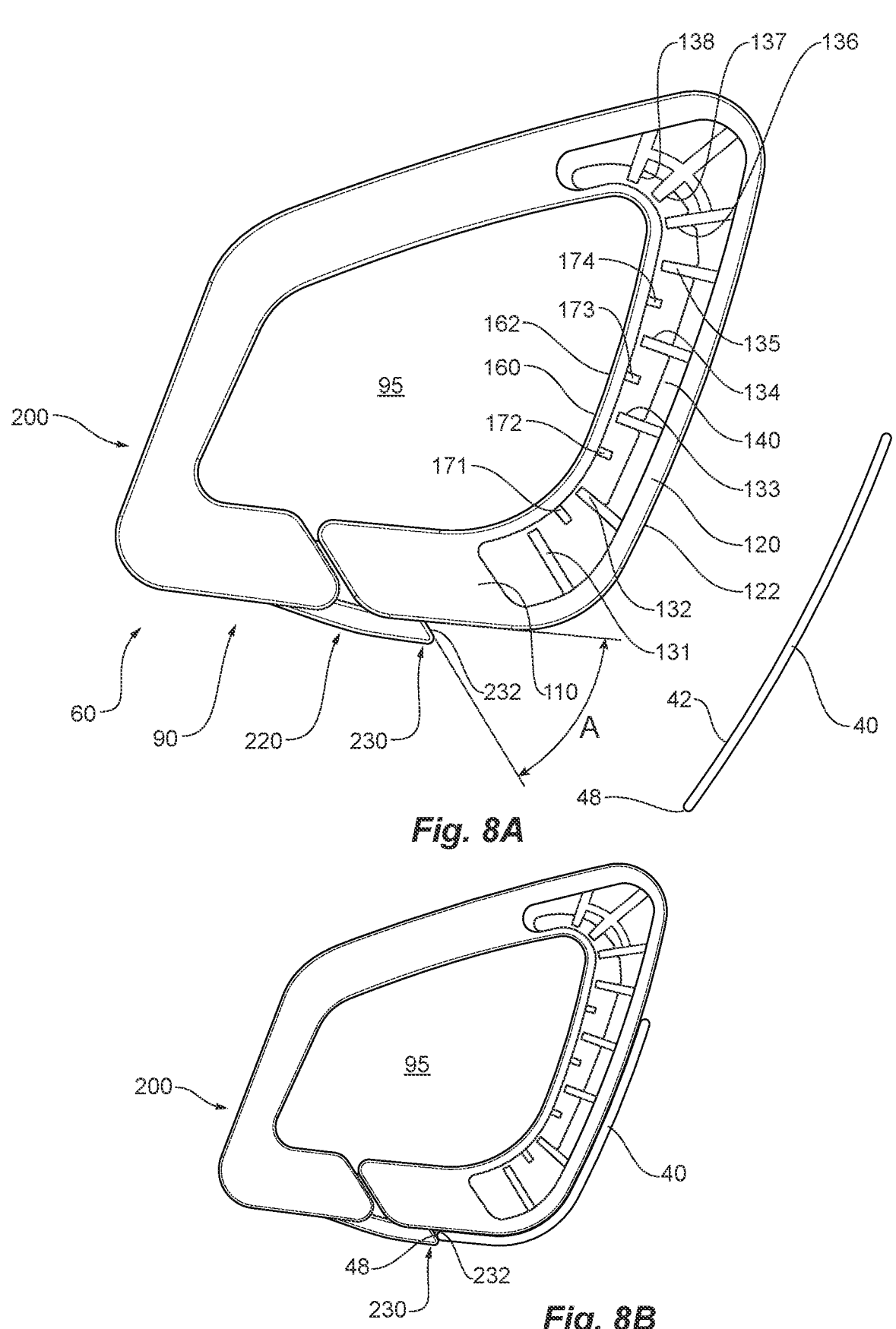
FIG. 8A is a similar view to that of FIG. 5, but shows a seat belt guide assembly component of a child seat according to a third embodiment of the disclosure, adjacent to a seat belt.
FIG. 8B is a similar view to that of FIG. 8A, but shows the seat belt show in FIG. 8A engaged with the seat belt guide assembly.

The size and position of the ribs can be varied to suit the particular application. For instance, a third embodiment of the disclosure is shown in FIG. 8A. With this embodiment, in addition to ribs 131, 132, 133, 134, 135, 136, 137, 138 extending inwards from the outer arm 120, ribs 171, 172, 173, 174 extend outwardly from inner arm 160. The gate portion 100 includes a stiffener 140 on the outer arm 120 which may be provided in some embodiments.

In some embodiments the gate portion 100 may include an outer arm 120 and an inner arm 160 without any ribs or stiffeners.

Referring to FIG. 8B, a seat belt guide assembly component of a child seat according to a third embodiment of the disclosure, engaged by a seat belt 40, is shown. In this position, a user, such as a parent or other child carer, may pull on the seat belt 40 so as to tension it against an outer surface 122 of the outer arm 120 as indicated in FIG. 8A. With sufficient tension applied to the seat belt 40 at an appropriate angle, the seat belt 40 itself can be used to displace the gate portion 100 inwards sufficiently to move the seat belt 40 into the aperture 95 within the ring 90 of the seat belt guide 60.

Referring now to FIGS. 8A and 8B together, it can be seen that the belt lead 230 includes a lead face 232, the lead face angled so as to lead a belt edge 48 of the seat belt towards the aperture 95 when the ring is in the closed condition. Thus, the gate portion 100 is openable by seat belt tension delivered by a user, such as a parent. A belt face 42 of the seat belt engages with an outer surface 122 of outer arm 120 of the gate portion 100 and the belt edge is guided by the lead face 232 such that the flexible gate portion 100 bends sufficiently to allow entry of the seat belt 40 into the aperture 95.

Again referring to FIG. 8A, it can be seen that, in the closed condition, the lead face 232 and the outer surface 122 of the outer arm 120 meet to define an acute angle "A". The effect of the acute angle "A" is that the belt 40 is less likely to ride over the belt lead 230 and is inclined to be captured such that its edge 48 slides along the lead face 232 promoting opening of the flexible gate portion and/or promoting entry of the seat belt 40 into the aperture 95.

Figures 9A, 9B:
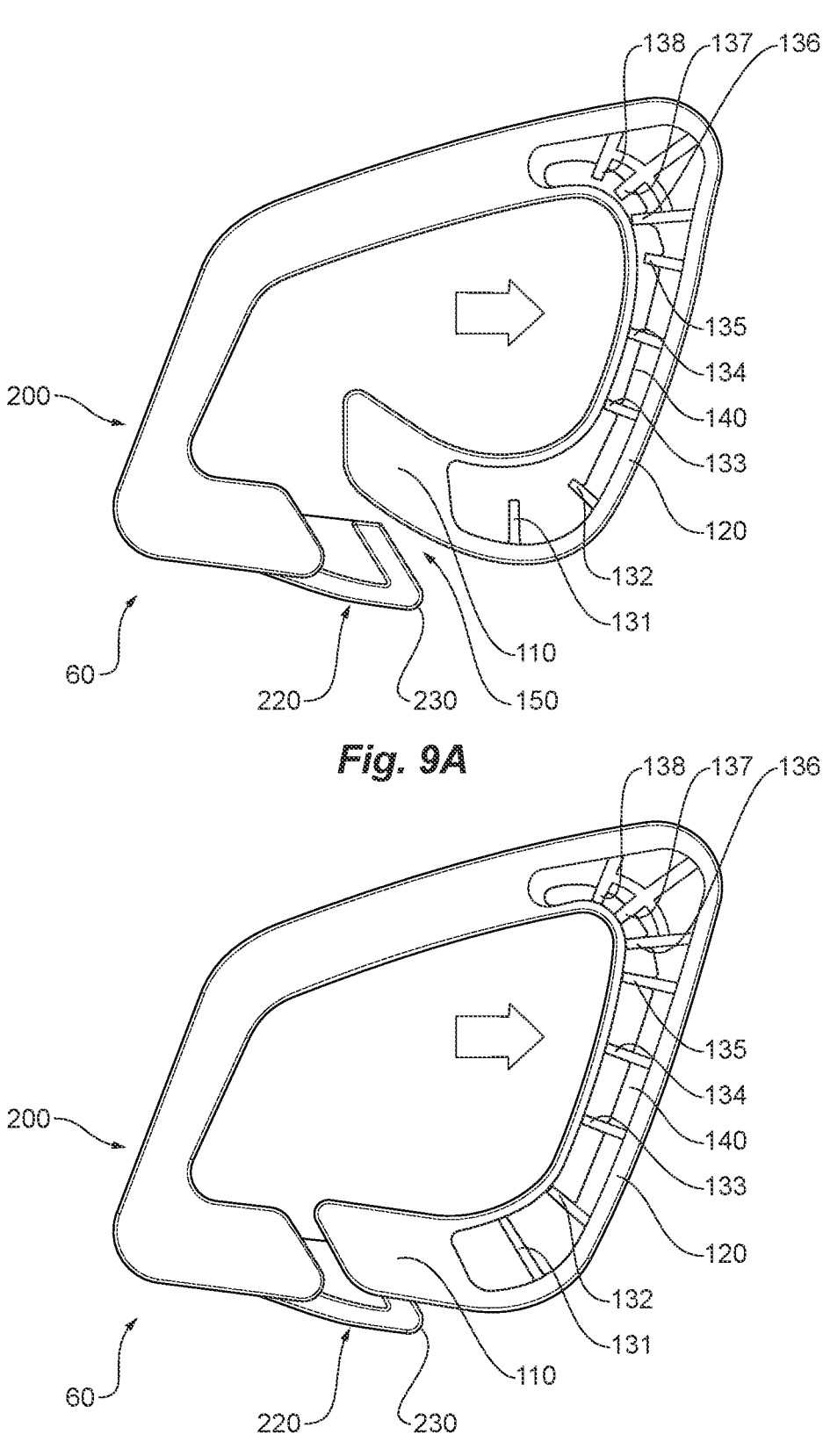
FIG. 9A is a side view of a seat belt guide assembly component, illustrating a potential failure deflection.
FIG. 9B is a side view of a seat belt guide assembly component of a child seat according to a fourth embodiment of the disclosure, this embodiment avoiding a potential failure deflection.

FIG. 9A is a side view of a seat belt guide assembly component 60, illustrating a potential failure deflection. With the seat belt guide assembly component 60 shown in this figure, at least some of the ribs 131, 132, 133, 134, 135, 136, 137, 138 that extend inwards from the outer arm 120 towards the inner arm 160 are too short to be engaged against the inner arm 160 at an optimum deflection of the inner arm. The result of this is that, during an accident, sudden deceleration, or other impact or jarring event, it is possible that the ring could be opened to the position shown in FIG. 9A.

FIG. 9B is a side view of a seat belt guide assembly component of a child seat according to a fourth embodiment of the disclosure. With this embodiment, the ribs 131, 132, 133, 134, 135, 136, 137, 138 are longer so that they engage the inner arm 160 as illustrated. This prevents the gate portion 100 and its connector 110 opening to form an opening that could allow a seatbelt to escape from the inside ring, in the event of an accident, sudden deceleration, or other impact or jarring event.

One manufacturing method used to produce the seat belt guide assembly 60 is plastic injection moulding. While various plastic injection moulding methods may be employed, sandwich injection moulding may be particularly suitable for some embodiments of the invention. Other suitable methods may be used.

Figures 10, 11, 12, 13:
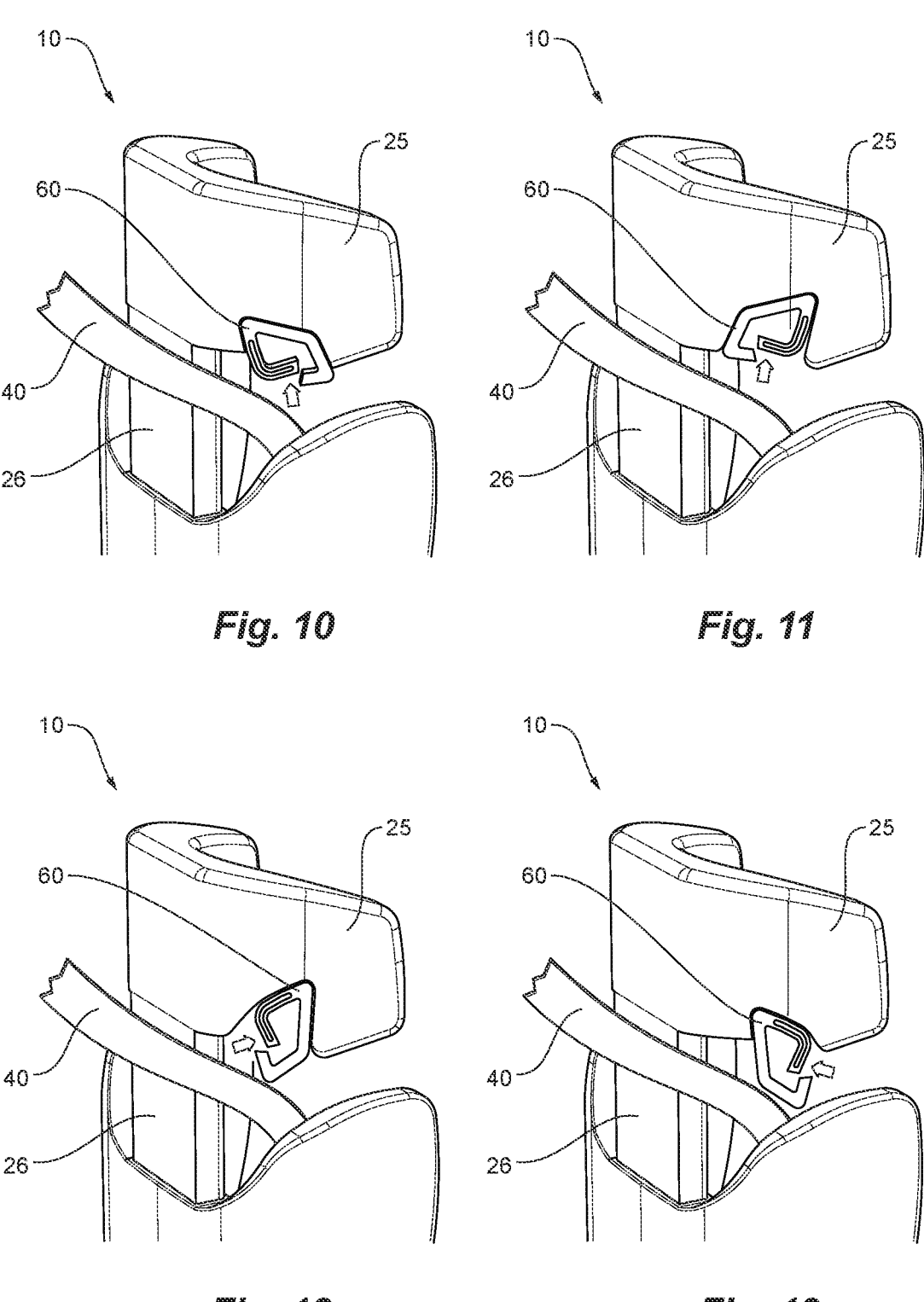
FIG. 10 is a similar perspective view of a child seat shown in FIG. 1B, but is shown in close up view showing a fifth embodiment of a child seat.
FIGS. 11, 12 and 13 are similar perspective views of a child seat shown in FIG. 10, showing a sixth, seventh and eighth embodiment of a seat belt guide assembly component of the child seat mounted to provide three (3) alternative orientations to that shown in FIG. 10.

FIG. 10 shows a fifth embodiment of a child seat in a perspective view. This embodiment uses the seatbelt guide 60 of the fourth embodiment shown in FIG. 9B, but the seatbelt guide 60 in a different orientation relative to the headrest assembly.

FIGS. 11, 12 and 13 are similar perspective views of a child seat shown in FIG. 10, showing sixth, seventh and eighth embodiments of a seat belt guide assembly component of the child seat mounted to provide three (3) alternative orientations to that shown in FIG. 10.

Figure 14A:
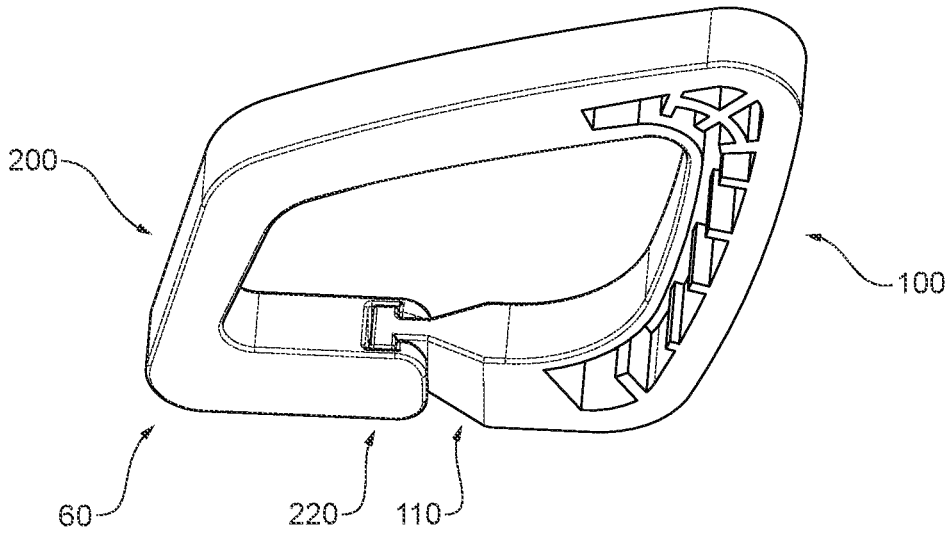
FIGS. 14A and 14B are perspective views showing a seat belt guide assembly component of the child seat of FIGS. 1A, 1B and 1C according to a ninth embodiment of the disclosure in closed and opened conditions respectively.
Figure 14B:
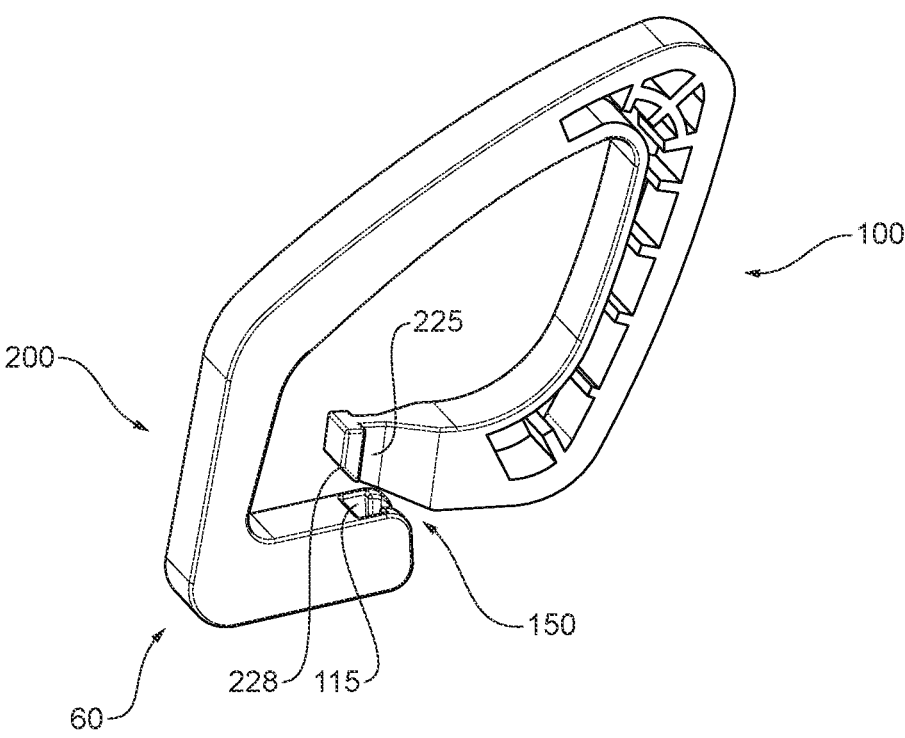

FIGS. 14A and 14B are perspective views showing a seat belt guide assembly component of the child seat of FIGS. 1A, 1B and 1C according to a ninth embodiment of the disclosure in closed and opened conditions respectively. This embodiment is similar to the embodiment shown in FIG. 5 for instance, however differs in that the tongue 228 is located on the flexible gate portion 110.

Figure 15A:
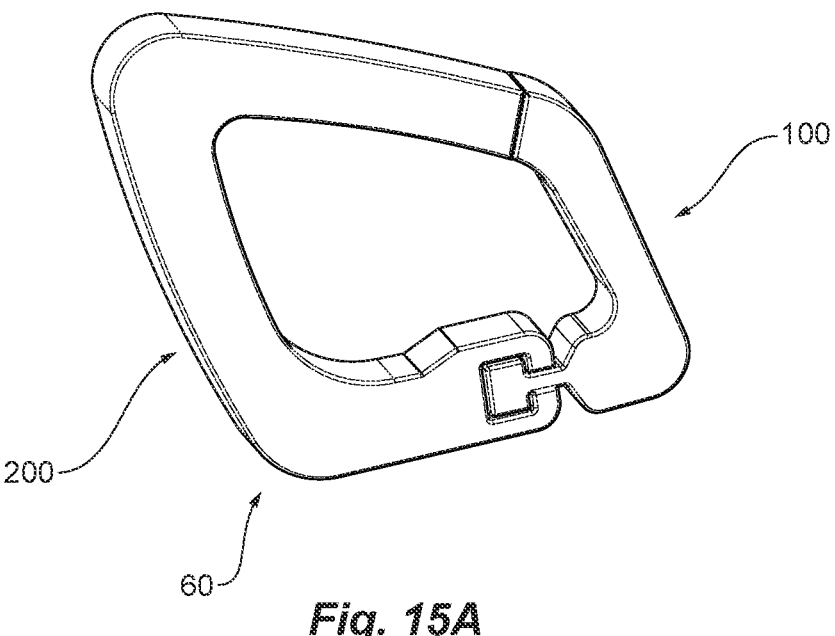
FIGS. 15A and 15B are perspective views showing a seat belt guide assembly component of the child seat of FIGS. 1A, 1B and 1C according to a tenth embodiment of the disclosure in closed and opened conditions respectively.
Figure 15B:
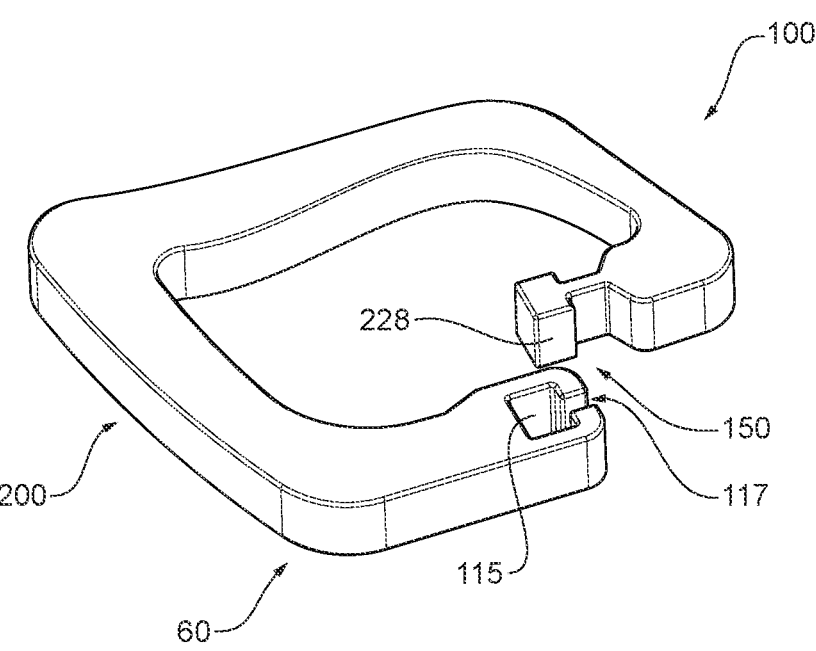

FIGS. 15A and 15B are perspective views showing a seat belt guide assembly component of the child seat of FIGS. 1A, 1B and 1C according to a tenth embodiment of the disclosure in closed and opened conditions respectively. This embodiment is similar to the embodiment shown in FIGS. 2A and 2B, however differs in that the flexible gate portion 110 is configured to move laterally rather than inwardly to open the ring.

FIG. 16 shows a perspective view of a child seat according to an eleventh embodiment of the disclosure.

Referring now to FIG. 16, a child seat 10 according to a twelfth embodiment of the disclosure is shown in a perspective view. The child seat 10 has a back assembly 20 that includes a non-adjustable headrest assembly 25 that is integral with a back-support portion 22. The headrest assembly 25 includes a seat belt guide assembly 60 mounted in an optimal position for a child falling within a range of heights. This arrangement lacks adjustability and therefore will only be optimal for children having a particular range of back lengths, for example, the child shown in dotted outline in FIG. 16.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A child seat having: a seat assembly, a back assembly connected to the seat assembly, and a seat belt guide assembly attached to the back assembly, the guide assembly including:

an openable ring having a closed condition defining an aperture and an open condition, the ring including:

a flexible gate portion terminating at a connector; and a receiver support portion terminating at a receiver for receiving the connector;

wherein the connector and the receiver are separable through elastic bending of the gate portion to open the ring sufficiently to allow installation of a vehicle seat belt there-through, wherein the connector and the receiver are mutually shaped to form a latch, the latch releasably holding the gate portion and the receiver support portion together, wherein the gate portion includes an outer arm and an inner arm, the inner arm disposed radially inwards from the outer arm and having an inner surface for guiding a seat belt, and wherein a plurality of ribs are disposed between the inner arm and the outer arm, the ribs having a fixed end and free end, the fixed end fixed with respect to one or other of the inner arm and the outer arm, whereby the ribs limit the relative displacement of the inner arm towards the outer arm.

2. The child seat as claimed in claim 1, wherein the connector is biased into engagement with the receiver.

3. The child seat as claimed in claim 2, wherein the back assembly includes:

a back-support portion; and a headrest assembly, the headrest assembly moveable with respect to the back-support portion, wherein the seat belt guide assembly is attached to the headrest assembly.

4. The child seat as claimed in claim 3, wherein the receiver support portion includes a belt lead.

5. The child seat as claimed in claim 4, wherein the belt lead includes a lead face, the lead face angled so as to lead a belt edge of the seat belt towards the aperture when the ring is in the closed condition.

6. The child seat as claimed in claim 5, wherein, in use, the gate portion is openable by seat belt tension delivered by a user, a belt face of the seat belt engaging with an outer surface of outer arm of the gate portion and the belt edge guided by the lead face, such that the flexible gate portion bends sufficiently to allow entry of the seat belt into the aperture.

7. The child seat as claimed in claim 5, wherein, in the closed condition, the lead face and the outer surface of the outer arm meet to define an acute angle.

8. The child seat as claimed in claim 3, wherein the connector is hand-moveable through an arc from the closed condition to the open condition.

9. The child seat as claimed in claim 8, wherein, in the open condition, the connector is displaced inwardly with respect to the receiver, the inward displacement providing an opening into the ring.

10. The child seat as claimed in claim 9, wherein the gate portion and connector are arranged and constructed such that movement of the connector in a direction perpendicular to the arc is resisted.

11. The child seat as claimed in claim 1, wherein one or more of the plurality of ribs limit the relative displacement of the inner arm towards the outer arm during an accident, thereby reducing any tendency for movement to the open condition.

12. The child seat as claimed in claim 1, wherein the latch includes a tongue and a mouth, one of the tongue and the mouth located on the receiver and the other of the tongue and the mouth located on the connector, wherein, in the closed condition, the tongue and the mouth are engaged and wherein, in the open condition, the tongue and the mouth are disengaged.

13. The child seat as claimed in claim 12, wherein the latch includes a web connected to the tongue.

* * * * *